(12) United States Patent
Yan

(10) Patent No.: US 8,612,340 B1
(45) Date of Patent: Dec. 17, 2013

(54) SYSTEM AND METHOD FOR DETECTING ACCOUNT COMPROMISES

(75) Inventor: Shuo Yan, Fremont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 13/617,820

(22) Filed: Sep. 14, 2012

Related U.S. Application Data

(62) Division of application No. 12/180,377, filed on Jul. 25, 2008.

(60) Provisional application No. 60/952,505, filed on Jul. 27, 2007.

(51) Int. Cl.
*G06Q 40/00* (2012.01)

(52) U.S. Cl.
USPC ............. 705/38; 705/35; 705/39; 705/42; 705/43

(58) Field of Classification Search
USPC ............................. 705/35, 38, 39, 42–43
See application file for complete search history.

(56) References Cited

U.S. PATENT DOCUMENTS

| | | | |
|---|---|---|---|
| 4,802,218 A | 1/1989 | Wright et al. | |
| 5,255,182 A | 10/1993 | Adams | |
| 6,094,643 A * | 7/2000 | Anderson et al. | ............... 705/44 |
| 6,330,546 B1 | 12/2001 | Gopinathan et al. | |
| 6,424,249 B1 | 7/2002 | Houvener | |
| 6,490,568 B1 | 12/2002 | O'Mara et al. | |
| 6,636,833 B1 | 10/2003 | Flitcroft et al. | |
| 6,663,833 B1 | 12/2003 | Stave et al. | |
| 6,714,918 B2 | 3/2004 | Hillmer et al. | |
| 6,853,987 B1 | 2/2005 | Cook | |
| 7,133,845 B1 | 11/2006 | Ginter et al. | |
| 7,505,931 B2 | 3/2009 | Da Silva | |
| 7,578,438 B2 | 8/2009 | Hogg et al. | |
| 7,580,891 B2 * | 8/2009 | Klebanoff | ....................... 705/44 |
| 7,610,216 B1 * | 10/2009 | May et al. | ....................... 705/18 |
| 7,945,515 B2 | 5/2011 | Zoldi et al. | |
| 8,024,271 B2 * | 9/2011 | Grant | .............................. 705/40 |
| 2002/0023215 A1 | 2/2002 | Wang et al. | |
| 2003/0158811 A1 | 8/2003 | Sanders et al. | |
| 2004/0139018 A1 | 7/2004 | Anderson et al. | |
| 2005/0131826 A1 | 6/2005 | Cook | |
| 2005/0278322 A1 | 12/2005 | Fan et al. | |
| 2006/0015733 A1 | 1/2006 | O'Malley et al. | |

(Continued)

OTHER PUBLICATIONS

"HNC Hopes to Capture More Fraud with Purchase." Bank Network News 19.9 (2000): 2- (1 page).*

(Continued)

*Primary Examiner* — Elda Milef
(74) *Attorney, Agent, or Firm* — Foley & Lardner LLP

(57) ABSTRACT

A method of identifying a point of compromise includes accessing data stored in a data storage system, the data being associated with a plurality of identified at-risk accounts, identifying a plurality of common points of transaction, each of the plurality of common points of transaction being associated with a minimum number of the plurality of identified at-risk accounts, and identifying a point of compromise from the plurality of common points of transaction based on (i) the number of the identified at-risk accounts involved in transactions executed via each common point of transaction during a time period, and (ii) a total number of accounts involved in transactions executed via the common point of transaction during the time period.

11 Claims, 13 Drawing Sheets

(56) References Cited

U.S. PATENT DOCUMENTS

| | | |
|---|---|---|
| 2006/0143122 A1 | 6/2006 | Sines et al. |
| 2006/0156385 A1 | 7/2006 | Chiviendacz et al. |
| 2006/0249574 A1 | 11/2006 | Brown et al. |
| 2006/0282660 A1 | 12/2006 | Varghese et al. |
| 2007/0192240 A1 | 8/2007 | Crooks |
| 2007/0250440 A1 | 10/2007 | Paulsen et al. |
| 2008/0005394 A1 | 1/2008 | Crooks |
| 2008/0109356 A1 | 5/2008 | Sutton et al. |
| 2008/0172316 A1 | 7/2008 | Adams |
| 2009/0132404 A1 | 5/2009 | King et al. |
| 2010/0145836 A1* | 6/2010 | Baker et al. .................. 705/30 |

OTHER PUBLICATIONS

Green, Jeffrey, "Taking a Swipe At Debit Card Fraud", Credit Card Management; Nov. 2000; 13, 8 (2 pages).

Office Action on U.S. Appl. No. 12/180,377, mail date May 5, 2011, 14 pages.

Office Action on U.S. Appl. No. 12/180,377, mail date Oct. 19, 2011, 16 pages.

Non-Final Office Action on U.S. Appl. No. 12/180,377, mail date Apr. 17, 2013, 14 pages.

\* cited by examiner

ACCOUNT CLUSTER DETECTION MODEL (SUMMARY LEVEL) 400

| | TRANS. CHANNEL 402 | STATE | CITY | ADDRESS 404 | ID 406 | DATE 408 | START TIME 410 | END TIME 412 | NO. OF TRANS. 414 | TOTAL AMT. ($) | DURATION 416 418 | TIME PER TRANSACTION 420 |
|---|---|---|---|---|---|---|---|---|---|---|---|---|
| 422 | WF ATM | CA | CARMICHAEL | 7225 MAIN STREET | 122 | 27-MAY-08 | 11:28:08 AM | 11:28:55 AM | 2 | $600 | 00:47 | 00:24 |
| 424 | NON-WF ATM | CA | NEWARK | 2900 LAKE DRIVE | 134 | 26-MAY-08 | 11:33:54 AM | 11:37:35 AM | 4 | $1,212 | 03:41 | 00:55 |
| 426 | NON-WF ATM | CA | SN FRANCSCO | 3146 FIRST STREET | 156 | 25-MAY-08 | 1:24:13 PM | 1:27:46 PM | 3 | $909 | 03:33 | 01:11 |
| 428 | NON-WF ATM | CA | LOS GATOS | 15425 SUNSET DRIVE | 178 | 24-MAY-08 | 2:01:36 PM | 2:26:20 PM | 7 | $2,118 | 24:44 | 03:32 |
| 430 | WF ATM | CA | SAN DIEGO | 3445 LINCOLN BLVD | 112 | 29-APR-08 | 10:31:02 AM | 10:34:13 AM | 5 | $1,500 | 03:11 | 00:38 |
| 432 | WF ATM | CA | SAN DIEGO | 10490 CLUB CIRCLE | 165 | 29-APR-08 | 1:52:12 PM | 1:57:21 PM | 6 | $1,900 | 05:09 | 00:51 |
| 434 | WF ATM | CA | HUNTINGTON BEACH | 6935 COLLEGE AVENUE | 143 | 28-APR-08 | 11:31:41 AM | 11:34:41 AM | 5 | $1,700 | 03:00 | 00:36 |
| 436 | WF ATM | CA | BREA | 230 S PACIFIC HIGHWAY | 157 | 28-APR-08 | 3:06:55 PM | 3:09:34 PM | 5 | $1,500 | 02:39 | 00:32 |
| 438 | WF ATM | CA | IRVINE | 15771 BLUEMOUND ROAD | 189 | 27-APR-08 | 7:33:34 AM | 7:45:08 AM | 22 | $7,600 | 11:34 | 00:32 |

FIG. 4

| ACCOUNT | STATE | CITY | CHANNEL | STATE | CITY | ADDRESS | DATE | TIME | AMOUNT | ID |
|---|---|---|---|---|---|---|---|---|---|---|
| | 502 | 504 | | 506 | | 508 | 510 | 512 | 514 | 516 |
| | | | | | ACCOUNT CLUSTER DETECTION MODEL (TRANSACTION LEVEL) | | | | | |
| 1 | CA | LOS GATOS | WF ATM | CA | IRVINE | 15771 BLUEMOUND ROAD | 4/27/2008 | 7:33:34 AM | $400 | 189 |
| 1 | CA | LOS GATOS | WF ATM | CA | IRVINE | 15771 BLUEMOUND ROAD | 4/27/2008 | 7:34:32 AM | $300 | 189 |
| 4 | CA | SAN JOSE | WF ATM | CA | IRVINE | 15771 BLUEMOUND ROAD | 4/27/2008 | 7:35:25 AM | $400 | 189 |
| 4 | CA | SAN JOSE | WF ATM | CA | IRVINE | 15771 BLUEMOUND ROAD | 4/27/2008 | 7:35:38 AM | $300 | 189 |
| 8 | CA | LOS GATOS | WF ATM | CA | IRVINE | 15771 BLUEMOUND ROAD | 4/27/2008 | 7:36:18 AM | $400 | 189 |
| 8 | CA | LOS GATOS | WF ATM | CA | IRVINE | 15771 BLUEMOUND ROAD | 4/27/2008 | 7:36:29 AM | $300 | 189 |
| 2 | CA | LOS GATOS | WF ATM | CA | IRVINE | 15771 BLUEMOUND ROAD | 4/27/2008 | 7:37:13 AM | $400 | 189 |
| 2 | CA | LOS GATOS | WF ATM | CA | IRVINE | 15771 BLUEMOUND ROAD | 4/27/2008 | 7:37:18 AM | $300 | 189 |
| 1 | CA | LOS GATOS | WF ATM | CA | IRVINE | 15771 BLUEMOUND ROAD | 4/27/2008 | 7:38:30 AM | $400 | 189 |
| 1 | CA | LOS GATOS | WF ATM | CA | IRVINE | 15771 BLUEMOUND ROAD | 4/27/2008 | 7:38:40 AM | $300 | 189 |
| 8 | CA | LOS GATOS | WF ATM | CA | IRVINE | 15771 BLUEMOUND ROAD | 4/27/2008 | 7:39:25 AM | $400 | 189 |
| 8 | CA | LOS GATOS | WF ATM | CA | IRVINE | 15771 BLUEMOUND ROAD | 4/27/2008 | 7:39:35 AM | $300 | 189 |
| 8 | CA | LOS GATOS | WF ATM | CA | IRVINE | 15771 BLUEMOUND ROAD | 4/27/2008 | 7:40:09 AM | $500 | 189 |
| 8 | CA | LOS GATOS | WF ATM | CA | IRVINE | 15771 BLUEMOUND ROAD | 4/27/2008 | 7:40:36 AM | $300 | 189 |
| 2 | CA | LOS GATOS | WF ATM | CA | IRVINE | 15771 BLUEMOUND ROAD | 4/27/2008 | 7:40:59 AM | $400 | 189 |
| 2 | CA | LOS GATOS | WF ATM | CA | IRVINE | 15771 BLUEMOUND ROAD | 4/27/2008 | 7:41:08 AM | $300 | 189 |
| 1 | CA | MONTE SERENO | WF ATM | CA | IRVINE | 15771 BLUEMOUND ROAD | 4/27/2008 | 7:41:43 AM | $400 | 189 |
| 1 | CA | MONTE SERENO | WF ATM | CA | IRVINE | 15771 BLUEMOUND ROAD | 4/27/2008 | 7:41:52 AM | $300 | 189 |
| 1 | CA | MONTE SERENO | WF ATM | CA | IRVINE | 15771 BLUEMOUND ROAD | 4/27/2008 | 7:42:27 AM | $300 | 189 |
| 1 | CA | MONTE SERENO | WF ATM | CA | IRVINE | 15771 BLUEMOUND ROAD | 4/27/2008 | 7:42:34 AM | $200 | 189 |
| 3 | CA | SAN JOSE | WF ATM | CA | IRVINE | 15771 BLUEMOUND ROAD | 4/27/2008 | 7:44:47 AM | $400 | 189 |
| 3 | CA | SAN JOSE | WF ATM | CA | IRVINE | 15771 BLUEMOUND ROAD | 4/27/2008 | 7:45:08 AM | $300 | 189 |

FIG. 5

| CHANNEL | MONTH | TRANS. STATE | TRANS. CITY | COMMON POINTS OF TRANSACTION 706 ||| NO. OF AT-RISK ACCTS. | AVG. TRANS. AMT. ($) |
| --- | --- | --- | --- | --- | --- | --- | --- | --- |
| | | | | NAME/ADDRESS OF MERCHANT | MERCHANT ID | | | |
| 11 | 200803 | CA | SACRAMENTO | JOE'S WHOLE FOODS MARKET | 5411 | 35 | $68 |
| 11 | 200804 | CA | SACRAMENTO | JOE'S WHOLE FOODS MARKET | 5411 | 26 | $69 |
| 11 | 200802 | CA | SACRAMENTO | JOE'S WHOLE FOODS MARKET | 5411 | 26 | $65 |
| 11 | 200801 | CA | SACRAMENTO | JOE'S WHOLE FOODS MARKET | 5411 | 24 | $71 |
| 11 | 200801 | CA | SACRAMENTO | SMITH'S GAS AND GROCERY | 5411 | 13 | $42 |
| 11 | 200803 | CA | SACRAMENTO | SMITH'S GAS AND GROCERY | 5411 | 13 | $31 |
| 11 | 200801 | CA | SACRAMENTO | SMITH'S GAS AND GROCERY | 5411 | 13 | $62 |
| 11 | 200802 | CA | SACRAMENTO | SACRAMENTO FOOD MARKET | 5411 | 12 | $70 |
| 11 | 200803 | CA | SACRAMENTO | SACRAMENTO FOOD MARKET | 5411 | 12 | $58 |
| 11 | 200804 | CA | SACRAMENTO | SACRAMENTO FOOD MARKET | 5411 | 11 | $51 |
| 11 | 200803 | CA | SACRAMENTO | JOE'S WHOLE FOODS MARKET | 5411 | 11 | $54 |
| 11 | 200804 | CA | SACRAMENTO | JOE'S WHOLE FOODS MARKET | 5411 | 10 | $40 |
| 11 | 200801 | CA | SACRAMENTO | ELECTRONICS ARE US | 5912 | 10 | $32 |
| 11 | 200802 | CA | SACRAMENTO | JOE'S WHOLE FOODS MARKET | 5411 | 10 | $59 |
| 11 | 200803 | CA | SACRAMENTO | ELECTRONICS ARE US | 5912 | 9 | $42 |
| 11 | 200801 | CA | SACRAMENTO | JOE'S WHOLE FOODS MARKET | 5411 | 9 | $49 |
| 11 | 200802 | CA | SACRAMENTO | JOE'S WHOLE FOODS MARKET | 5411 | 9 | $55 |

| | | POINT OF COMPROMISE DETECTION MODEL | | | | | |
|---|---|---|---|---|---|---|---|
| TRANS. MONTH | TRANS. STATE | TRANS. CITY MERCHANT NAME / ADDRESS OF | MERCHANT ID | AT RISK ACCTS. | AVG. TRANS. AMT. $ | ACCT. VOL. | AVG. TRANS. AMT. ($) | PERCENTAGE |
| 200803 | CA | SACRAMENTO JOE'S WHOLE FOODS MARKET | 111 | 35 | $68 | 2,333 | $66 | 2 |
| 200801 | CA | SACRAMENTO SMITH'S GAS AND GROCERY | 112 | 10 | $32 | 1,031 | $36 | 1 |
| 200804 | CA | SACRAMENTO JOE'S WHOLE FOODS MARKET | 111 | 26 | $69 | 2,112 | $65 | 1 |
| 200801 | CA | SACRAMENTO JOE'S WHOLE FOODS MARKET | 111 | 24 | $71 | 2,141 | $66 | 1 |
| 200804 | CA | SACRAMENTO SMITH'S GAS AND GROCERY | 112 | 7 | $38 | 1,036 | $37 | 1 |
| 200802 | CA | SACRAMENTO JOE'S WHOLE FOODS MARKET | 111 | 26 | $65 | 2,115 | $66 | 1 |
| 200801 | CA | SACRAMENTO COUNTRY MARKET | 111 | 13 | $42 | 2,575 | $53 | 1 |
| 200801 | CA | SACRAMENTO ELECTRONICS SUPERSTORE | 112 | 6 | $39 | 793 | $39 | 1 |
| 200803 | CA | SACRAMENTO SACRAMENTO FOOD MARKET | 111 | 12 | $58 | 6,372 | $51 | 0 |
| 200801 | CA | SACRAMENTO SACRAMENTO FOOD MARKET | 111 | 13 | $62 | 5,972 | $52 | 0 |

POINT OF COMPROMISE DETECTION - DAILY COMPARISON

| TRANS. MONTH | CHANNEL | ADDRESS | MERCHANT | MERCHANT ID | TERMINAL ID | MERCHANT CLASS | AT-RISK ACCTS. | 1 DAY | 2 DAY | 3 DAY | AVG. TRANS. AMT. | ACCT. VOL. | AVG. TRANS. AMT. ALL TRANS. ($) | PERCENTAGE |
|---|---|---|---|---|---|---|---|---|---|---|---|---|---|---|
| 200804 | POS | SUNNYVALE | QUICK PAY | 54 | 116 | 12 | 28 | 8 | 0 | 0 | 53 | 628 | 78 | 4 |
| 200803 | POS | SUNNYVALE | QUICK PAY | 54 | 116 | 12 | 19 | 5 | 0 | 0 | 55 | 621 | 81 | 3 |
| 200805 | POS | SUNNYVALE | QUICK PAY | 54 | 116 | 12 | 20 | 5 | 0 | 0 | 72 | 638 | 78 | 3 |

FIG. 10

COMPROMISE EXPOSURE DATE RANGE PERMUTATION MODEL 1300

| NO. OF DAYS: 1302 | START DATE 1304 | END DATE | NO. OF AT-RISK ACCTS CAPTURED 1306 | TOT. NO. OF AT-RISK ACCTS 1308 | 1310 | CAPTURE RATE 1312 | TOTAL NO. OF ACCTS 1314 |
|---|---|---|---|---|---|---|---|
| 44 | 2/16/2008 | 3/31/2008 | 92 | 92 | | 100% | 2,754 |
| 45 | 2/15/2008 | 3/31/2008 | 92 | 92 | | 100% | 2,785 |
| 15 | 3/16/2008 | 3/31/2008 | 91 | 92 | | 99% | 1,572 |
| 19 | 3/13/2008 | 4/1/2008 | 91 | 92 | | 99% | 1,799 |
| 24 | 3/9/2008 | 4/2/2008 | 91 | 92 | | 99% | 2,052 |
| 16 | 3/14/2008 | 3/30/2008 | 89 | 92 | | 97% | 1,645 |
| 36 | 2/22/2008 | 3/29/2008 | 87 | 92 | | 95% | 2,515 |
| 4 | 3/26/2008 | 3/30/2008 | 83 | 92 | | 90% | 666 |
| 56 | 2/1/2008 | 3/28/2008 | 82 | 92 | | 89% | 3,135 |
| 6 | 3/23/2008 | 3/29/2008 | 81 | 92 | | 88% | 839 |
| 94 | 3/28/2008 | 6/30/2008 | 80 | 92 | | 87% | 4,489 |
| 5 | 3/24/2008 | 3/29/2008 | 79 | 92 | | 86% | 730 |
| 93 | 3/29/2008 | 6/30/2008 | 77 | 92 | | 84% | 4,456 |
| 6 | 3/27/2008 | 4/2/2008 | 76 | 92 | | 83% | 877 |
| 54 | 2/1/2008 | 3/26/2008 | 76 | 92 | | 83% | 3,075 |
| 5 | 3/27/2008 | 4/1/2008 | 75 | 92 | | 82% | 788 |
| 12 | 3/16/2008 | 3/28/2008 | 75 | 92 | | 82% | 1,361 |
| 4 | 3/27/2008 | 3/31/2008 | 74 | 92 | | 80% | 684 |

SYSTEM AND METHOD FOR DETECTING ACCOUNT COMPROMISES

CROSS-REFERENCE TO RELATED PATENT APPLICATIONS

This application is a divisional of U.S. Non-Provisional application Ser. No. 12/180,377, filed Jul. 25, 2008, which claims the benefit of U.S. Provisional Application No. 60/952,505, filed Jul. 27, 2007, both of which are incorporated by reference herein in their entirety.

BACKGROUND

The present disclosure relates generally to the field of detecting account compromises, and more specifically, to detecting account compromises involving financial accounts and associated financial transactions such as bank transactions, automated teller (e.g., ATM) transactions, point of sale transactions, etc.

Accounts such as financial accounts may be compromised in several ways. For example, an automated teller machine may be monitored in order to obtain account information such as account numbers, passwords or personal identification numbers (PINs), etc., such that one or more accounts become compromised and the misappropriated information may later be used in fraudulent transactions. Financial accounts may also be compromised in a variety of other ways, including electronic data theft and other means.

There are many challenges associated with detecting and mitigating the impact of fraudulent transactions resulting from account compromises. Accordingly, it would be advantageous to provide an improved system and method for detecting and mitigating account compromises.

SUMMARY

One embodiment relates to a method of identifying a point of compromise, comprising accessing data stored in a data storage system, the data being associated with a plurality of identified at-risk accounts, identifying a plurality of common points of transaction, each of the plurality of common points of transaction being associated with a minimum number of the plurality of identified at-risk accounts, and identifying a point of compromise from the plurality of common points of transaction based on (i) the number of identified at-risk accounts involved in transactions executed via each common point of transaction during a time period, and (ii) a total number of accounts involved in transactions executed via the common point of transaction during the time period.

Another embodiment relates to a method of identifying a group of potentially fraudulent transactions, comprising accessing transaction data stored in a data storage system, the transaction data being associated with a plurality of transaction locations, identifying at least one group of transactions based on a minimum number of transactions, a minimum dollar amount, and a maximum time period, and providing an output including data associated with the group of transactions.

Another embodiment relates to a computer-implemented data processing system, comprising a data storage system and logic configured to access data stored in the data storage system, the data being associated with a plurality of common points of transaction and including data for a plurality of identified at-risk accounts, for each of the plurality of common points of transaction, determine a total number of accounts involved in transactions executed via the common point of transaction, determine a ratio of (i) the number of identified at-risk accounts involved in transactions executed via the common point of transaction to (ii) the total number of accounts involved in transactions executed via the common point of transaction, and compare the ratio to a threshold ratio, and identify at least one point of compromise based on the comparison of the ratio and the threshold ratio for each of the common points of transaction.

Another embodiment relates to a computer-implemented data processing system, comprising a data storage system and exposure date range logic configured to access data stored in the data storage system, the data being associated with a plurality of identified at-risk accounts associated with a transaction location, for each of a plurality of time periods, determine a number of the plurality of identified at-risk accounts involved in transactions executed via the transaction location during the time period, determine a capture rate, the capture rate being based on (i) the number of identified at-risk accounts involved in transactions executed via the transaction location during the time period, and (ii) the total number of identified at-risk accounts, and determine the total number of accounts involved in transactions executed via the transaction location during the time period, select an exposure data range from one of the plurality of time periods based on (i) a comparison of the capture rate of the time period with the threshold capture rate, and (ii) the total number of accounts involved in transactions during the time period, and provide an output identifying the total number of accounts involved in transactions executed via the transaction location during the exposure date range.

Another embodiment relates to a method of identifying a point of compromise, comprising accessing data stored in a data storage system, the data being associated with a plurality of identified at-risk accounts, identifying a plurality of common points of transaction, each of the plurality of common points of transaction being associated with a minimum number of identified at-risk accounts, identifying a point of compromise from the plurality of common points of transaction based on (i) the number of identified at-risk accounts involved in transactions executed via the common points of transaction during a time period, and (ii) a total number of accounts involved in transactions executed via the common point of transaction during the time period, identifying a portion of the time period less than the time period based on (i) the percentage of the identified at-risk accounts involved in transactions executed via the point of compromise during the portion of the time period, and (ii) a total number of accounts involved in transactions executed via the point of compromise during the portion of the time period, and providing an output identifying the total number of accounts involved in transactions during the portion of the time period.

BRIEF DESCRIPTION OF THE DRAWINGS

FIG. 4 is summary level listing of clusters of potentially fraudulent transactions according to an exemplary embodiment.

FIG. 5 is a transaction level listing of a cluster of potentially fraudulent transactions according to an exemplary embodiment.

FIG. 7 is a listing including one or more common points of transaction according to an exemplary embodiment.

FIG. 9 is a listing including one or more points of compromise according to an exemplary embodiment.

FIG. 10 is a listing including a daily comparison of point of compromise activity according to an exemplary embodiment.

FIG. 13 is a listing including exposure date range data according to an exemplary embodiment.

DETAILED DESCRIPTION OF EXEMPLARY EMBODIMENTS

Figure 1:
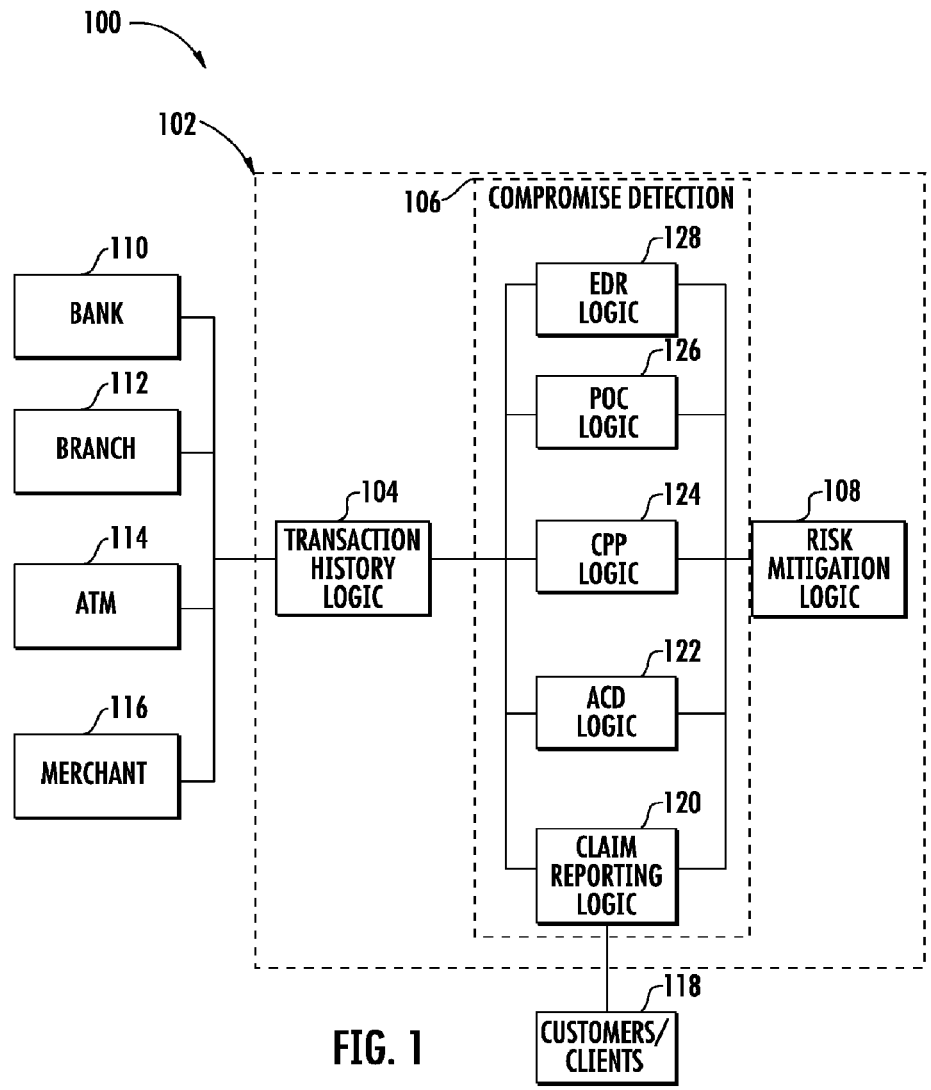
FIG. 1 is a block diagram of a data processing system including a compromise detection system according to an exemplary embodiment.

According to various embodiments, a system and method are provided that may be configured to detect potentially fraudulent activity, including fraudulent or potentially fraudulent transactions, and potentially compromised accounts. In some embodiments, historical transaction data for financial accounts may be analyzed. The historical data may include a list of compromised accounts, and the merchants at which these accounts were used over a period of time. The total number accounts that used these merchants over a period of time (including those that were not compromised) may also be analyzed. The merchants at which a plurality of compromised accounts had transactions may be identified and recorded or added to a list. Merchants at which a sufficient or threshold percentage of the total accounts (both compromised and uncompromised) had transactions may be eliminated from the list to avoid false positive indications. From the merchant(s) remaining on the list, the point of compromise may be detected. To identify the time of compromise, the percentage of accounts that had transactions at the point of compromise in a given period of time may be utilized by fraudsters. Irregularly high values (e.g., spikes in graph) may trigger further analysis.

According to an exemplary embodiment, an analysis tool and associated process identifies accounts (e.g., compromised credit/debit/ATM accounts) by analyzing the transaction history of the accounts to identify suspected locations (e.g., merchant/ATM locations) where cardholder or other data may have been compromised.

In some embodiments, the system(s) and method(s) disclosed herein are intended to detect merchant and ATM compromises where cardholder account data may have been compromised during a legitimate transaction, followed by fraudulent transactions by fraudsters using counterfeit cards. Trade handling services, financial services companies, and banks have relied on external alert services (e.g., CAMS Alert Service by VISA and Card Alert Service by Fair Isaac Corp.) as well as ad-hoc manual common point of transaction history research conducted by internal resources.

The various embodiments disclosed herein may provide many advantages over conventional systems and methods. For example, fraud alerts often come in late after the majority of fraudulent transaction activities have already taken place. Further, typical alerts often do not provide adequate compromise detection coverage due to their data limitation, and often do not reveal compromised merchant names and locations due to legal concerns.

The various embodiments disclosed herein enable banks and/or other institutions to detect and identify various types of credit/debit/ATM card or other account compromises to capture emerging fraud problems much sooner and more comprehensively than other tools. For example, in various embodiments, the system and method provided herein may identify a merchant and/or ATM compromise location, a timeframe, and a volume of accounts at-risk, emerging fraud problems (sooner and more comprehensively than previous systems due to their data limitations), and suspected point of compromise merchants for at-risk or potentially compromised accounts, to assist loss recovery efforts. Furthermore, a targeted point of compromise fraud detection system may be implemented to identify events that impact only accounts associated with a particular financial institution. Furthermore, various "sizes" of points of compromise can be detected by adjusting threshold settings.

In some embodiments, two looping procedures are used to sort out suspected point of compromise locations. A first procedure may identify the common point of purchase locations where fraudulent accounts have had transactions executed during a given period of time. Subsequently, a second procedure may analyze the common point of purchase locations identified by the first procedure and identify suspected point of compromise locations. Minimum thresholds may be incorporated and adjusted to control the output(s) to detect various "sizes" of points of compromise.

In various alternate embodiments, the system and method disclosed herein may identify high fraud risk merchant and geographical locations where fraudsters execute frequent fraudulent transactions with counterfeit cards (enabling identification of new fraud trends and providing opportunities to implement appropriate strategies and actions to prevent future fraud losses), provide strong statistical evidence for potential legal investigations, heighten awareness of potential connections and common attributes among fraudulent accounts, distinguish between point(s) of compromise and common point(s) of purchase, provide early detection and potential risk exposure data regarding the volume of accounts at-risk, identify point of compromise merchant names, locations, and associated timeframes, provide multiple levels of detection, including incoming fraud claims, queued high risk accounts, declined/referred accounts, high fraud score transactions/accounts, and potential points of compromise that external alert services cannot detect due to data limitations. In most instances, point of compromise detection may be accomplished prior to receiving any alerts from external alert services.

The present disclosure provides a unique way to process incoming reports of fraud or potentially compromised accounts, including identifying whether there are any identified compromises attributable to incoming claims, identifying whether there are any connections/common attributes among incoming claims, and identifying merchant types/ merchant locations where fraudsters are transacting (e.g., with counterfeit cards).

In some embodiments, a system and method are provided that analyze daily transaction (e.g., ATM transactions) history to identify suspicious clusters of transactions, transaction locations, and corresponding accounts involved. A suspicious cluster-style fraudulent transaction pattern may involve a relatively high frequency of high dollar withdrawals within a short time frame at an individual transaction location. Prior to the cluster of potentially fraudulent transactions, a group of debit/ATM cards and PIN numbers may have been compromised by a fraudster during a legitimate transaction.

According to an exemplary embodiment, a first procedure may identify all locations where a minimum threshold of accounts (e.g., at least 4), had large dollar withdraws (e.g., at least $200) on any given day. A second procedure may then calculate the time difference (in hours, minutes, seconds, etc.) between the transactions at each location identified in the first procedure. A third procedure may compare the time difference of the transactions at an individual location and identify locations and account numbers involved in suspicious transaction activity based on adjustable threshold values (e.g., a minimum of 4 account cards used in transactions during 10 minutes at one ATM location). A fourth procedure may then utilize the account data identified in the third procedure and run them through point of compromise logic to identify one or more point of compromise merchants and/or a compromise exposure window associated with the compromise, and to identify additional accounts at-risk.

Minimum thresholds may be incorporated into the various embodiments and be adjusted to detect various sizes of points of compromises. The adjustable thresholds may include a time difference (e.g., 10 minutes), a minimum number of unique account numbers transacted at one location within a short time frame (e.g., 4 transactions within 10 minutes), and a minimum transaction amount (e.g., $200). In some embodiments, identified accounts and/or debit/credit/ATM cards may be proactively deactivated.

Referring now to FIG. 1, a system 102 (e.g., one or more computers executing program instructions stored in memory, a data processing system, an account management system, etc.) is shown according to an exemplary embodiment. As shown in FIG. 1, system 102 is configured to communicate (e.g., over a wired or wireless communications network) with a variety of transaction locations (e.g., points of transaction, points of purchase, etc.), such as a bank 110, a bank branch 112, an automated teller machine (ATM) 114, and/or a merchant or point-of-sale (POS) terminal 116. The transaction locations shown in FIG. 1 are provided for purposes of illustration only, and the subject matter of the present disclosure may be applied to systems using more, fewer, or different transaction locations than those shown in FIG. 1. Furthermore, system 102 may be integrated into one or more of the transaction locations (e.g., provided as part of a computer system for a bank such as bank 110).

System 102 may include transaction history logic 104, compromise detection logic 106, and risk mitigation logic 108. Transaction history logic 104 may be configured to receive, store, and provide access to account data received from the various transaction locations and other sources for accounts associated with a financial institution such as a bank, a credit card issuer, etc. Compromise detection logic 106 may be configured to receive and/or access data from transaction history logic 104 and/or claim reporting logic 120 in order to identify or detect fraudulent or other transactions that may result in the compromise of one or more accounts (e.g., financial accounts such as bank accounts, credit card accounts, etc., managed by a financial institution such as a bank, a credit/debit/ATM card issuer, etc.). Compromise detection logic 106 may further be configured to provide transaction, account, and other data to risk mitigation logic 108. Risk mitigation logic 108 may be configured to take appropriate action to mitigate the impact of any fraudulent and/or potentially fraudulent activity (e.g., placing holds on account activity, providing notifications to account holders, reissuing credit/debit/ATM cards, etc.).

As shown in FIG. 1, compromise detection logic 106 may include claim reporting logic 120, account cluster detection (ACD) logic 122, common point of purchase (CPP) logic 124, point of compromise (POC) logic 126, and exposure date range (EDR) logic 128. The various logic components are configured to communicate with each other, and with transaction history logic 104 and risk mitigation logic 108, and are further configured to access data that may be stored in data storage systems (e.g., computer databases, memories, etc.) associated with the various logic components (e.g., processors, etc.).

Figure 2:
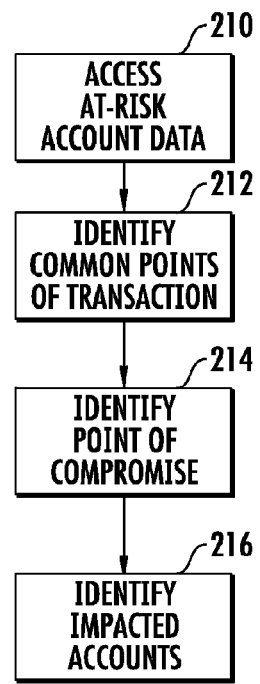
FIG. 2 is a flow chart illustrating a method of detecting account compromises according to an exemplary embodiment.

Referring to FIG. 2, a method of detecting fraudulent activity is shown according to an exemplary embodiment. First, account data for identified at-risk accounts may be accessed (step 210), for example, by CPP logic 124. As discussed in more detail below, identified at-risk accounts, or at-risk accounts, may include accounts that have been identified as being compromised, and may be identified in a variety of ways, including identifying declined, referred, or queued transactions, receiving fraud reports from customers or outside fraud alert services, receiving input from ACD logic 122 (discussed in detail below), or from a variety of other sources. The at-risk account data may be analyzed by CPP logic 124 to identify one or more common points of purchase or common points of transaction (step 212), which in one embodiment may include any transaction locations at which a minimum number of identified at-risk accounts were involved in transactions during a specific time period. From the common points of purchase, one or more points of compromise may be identified (step 214) by POC logic 126 by eliminating any false-positive indications. For example, CPP logic 124 may identify a relatively smaller retailer and a relatively larger retailer as both having 5 transactions associated with identified at-risk accounts. However, because the larger retailer may do a significantly larger volume of total transactions, POC logic 126 may eliminate the larger retailer as a point of compromise based on the relative numbers of transactions associated with identified at-risk accounts and the total number of transactions/accounts associated with a particular transaction location. In one embodiment, identifying the point(s) of compromise includes identifying any transaction locations where a minimum number of a total number of accounts, involved with transactions at the transaction location, later became compromised. In some embodiments the "total" number of accounts may be a total number of accounts managed by an individual financial institution (e.g., an individual bank, etc.). Using the point(s) of compromise data, the total number of impacted accounts may be determined (step 216), and appropriate mitigation efforts implemented by risk mitigation logic 108. The various logic components of compromise detection logic 106 and their interaction with the various other components of system 102 will now be described in greater detail.

Claim reporting logic 120 may receive inputs for compromise detection logic 106 via information or data received from clients and/or customers 118 of a financial institution. For example, claim reporting logic 120 may receive data regarding reports of actual and/or suspected fraudulent activity for identified at-risk accounts from customers 118 via a customer service call center, an on-line (e.g., web-based, etc.) reporting service, or any other suitable means. Further, claims reporting logic may be configured to receive, store, and/or provide data for identified at-risk accounts that are associated with one or more transactions and/or accounts that have been declined, deferred, and/or queued. Declined transactions/accounts may include transactions/accounts where a transaction (e.g., a purchase at a retail store) is declined for some reason. Referred transactions/accounts may include transactions/accounts where a transaction has been referred for verification at the time of the transaction (e.g., such as a phone call from a credit card issuer to a purchaser to confirm the identity of the purchaser, etc.). Queued transactions/accounts may include transactions/accounts where a transaction is not declined or referred, but is later analyzed to confirm that the transaction did not involve fraudulent or other improper activity. Claim reporting logic may provide data regarding potentially fraudulent transactions or identified at-risk accounts to any of the logic components discussed herein.

Account cluster detection (ACD) logic 122 (e.g., account cluster detection model (ACDM) logic) may be configured to identify clusters or groups of fraudulent or otherwise improper transactions based on an analysis of historical transaction data. For example, ACD logic 122 may be configured to identify clusters or groups of transactions that satisfy one or more threshold requirements, which may include a minimum transaction amount (e.g., $200 per transaction), a minimum number of transactions (e.g., 5 transactions executed via a single transaction location), and/or a maximum time period (e.g., 20 minutes, during which the minimum number of transactions are executed). For example, if 20 transactions are conducted at an ATM machine in 10 minutes, all of which involve amounts of $200 or greater, then such transactions may be identified as a cluster of potentially fraudulent transactions. The thresholds may be configured by a user to identify probable clusters or groups of fraudulent transactions (e.g., groups of transactions that are highly unlikely or even impossible given the threshold values) and may be varied to identify different-sized groups or clusters of transactions.

According to various alternative embodiments, more complex threshold parameters may be used, such that the value of one or more threshold values may vary with changes in the data associated with a particular cluster. For example, the thresholds may be configured such that the maximum time period threshold increases or decreases with increases or decreases in the dollar amounts and number of transactions associated with particular groups or clusters. Similarly, clusters of transactions may be evaluated on an overall basis based on the number of transactions, the dollar amounts involved, and/or the time period involved (e.g., to provide a composite score or other indication of the likelihood that the cluster includes fraudulent transactions).

Figure 3:
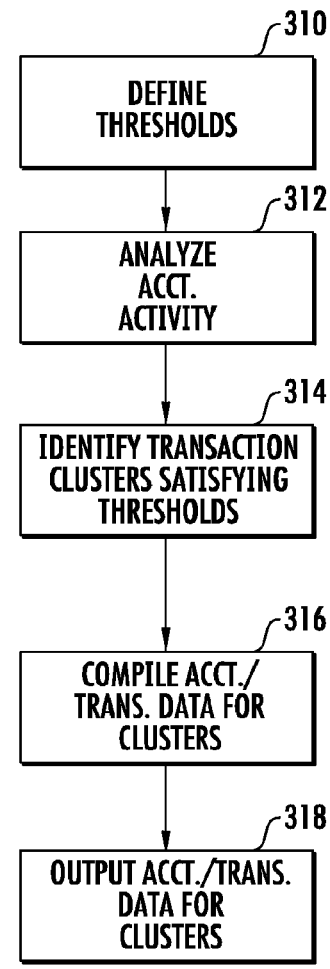
FIG. 3 is a flow chart illustrating a method of identifying clusters of potentially fraudulent transactions according to an exemplary embodiment.

Referring to FIGS. 3-5, a method of utilizing ACD logic 122 is illustrated according to an exemplary embodiment. As shown in FIG. 3, one or more threshold requirements may be defined or adjusted by a user (step 310). For example, as indicated above, the threshold requirements may include a minimum dollar amount (which may be defined on a per transaction basis, an average per transaction basis, a per transaction group (total) basis, and so on), a minimum number of transactions (e.g., a minimum number of transactions executed via a single transaction location such as an ATM), and a maximum time period (e.g., a time period during which the minimum number of transactions are executed, a maximum time period between transactions, a maximum average time period between transactions, and so on).

Referring further to FIG. 3, once the threshold requirements are identified, transaction data may be analyzed (step 312). According to an exemplary embodiment, ACD logic 122 accesses account data for a plurality of financial accounts. In one embodiment, the accounts are all managed by a single financial institution. ACD logic 122 may analyze the account data and identifies any clusters or groups of transactions that satisfy the threshold requirements (step 314), including identifying the individual accounts that may be impacted by the potentially fraudulent transactions. Once the clusters are identified, ACD logic 122 may compile summary level or transaction-level details (step 316) and provide data associated with the identified groups or clusters to a user or other logic components (step 318).

For example, as shown in FIG. 4, a summary level listing 400 of clusters of transactions identified by ACD logic 122 is shown according to an exemplary embodiment. Listing 400 may be generated as output of compromise detection logic 106 to provide a report of clusters of potentially fraudulent transactions and associated identified at-risk accounts. As shown in FIG. 4, listing 400 may identify a number of groups or clusters, each represented by a row (e.g., one of rows 422-438) in listing 400. For each group or cluster, summary level information may be provided, including a transaction channel 402 (e.g., the type of transaction location through which the group of transactions were executed), customer location information 404 (e.g., state, city, street address, etc.) that identifies the location of the transaction location through which the transaction were executed, a transaction location ID 406, which may be a unique identifier associated with the transaction location (e.g., an ATM and associated ATM ID number), a date 408 on which the transactions within the group were executed, a start time 410, end time 412, and duration 418 (e.g., a time period during which the group of transactions were executed), a number of transactions executed 414, a total dollar amount transacted 416, and a time per transaction 420. It should be noted that more or less information may be provided as part of summary level listing 400 according to various exemplary embodiments.

The data in FIG. 4 illustrates how ACD logic 122 may identify clusters or groups of potentially fraudulent transactions. In one embodiment, listing 400 may provide a report of any clusters of transactions identified by ACD logic 122 as being a cluster of fraudulent transactions. For example, referring to line 438 in FIG. 4, 22 transactions were executed at a single transaction location in 11 minutes and 34 seconds, with an average time per transaction of 32 seconds and a total dollar amount of $7,600. Assuming for illustrative purposes that the threshold requirements were set to a minimum of 10 transactions executed within a maximum of 30 minutes for a total dollar amount of at least $5,000, ACD logic 122 would identify the group of transactions identified in line 438 as being a group of potentially fraudulent transactions. As discussed above, other threshold requirements or thresholds may be utilized in generating listing 400.

Referring to FIG. 5, ACD logic 122 may further provide a detail listing 500 for one or more individual clusters or groups of transactions. For example, the data shown in listing 500 is a transaction level listing of the group of transactions represented by line 438 of FIG. 4. Various data may be provided as part of listing 500, including an account identifier 502 (e.g., an account no. etc.), location information 504 for the customers associated with the various account numbers, a transaction channel 506 for the transaction location, location information 508 for the transaction location, a date 510, a transaction time 512, a transaction amount 514 for each transaction of the group, and a transaction location ID for the transaction location. Listing 500 may include data for one or more transaction groups or clusters, and the data therein may be provided as an output to a user or other logic components to assist in identifying trends in fraudulent activity.

ACD logic 122 may be configured to identify groups of clusters for a defined time period (e.g., on a daily basis, etc.) and may further be configured to store the data regarding identified at-risk (e.g., the accounts identified as being associated with the groups or clusters of potentially fraudulent transactions) in a data storage system accessible by or incorporated into ACD logic 122 or other logic component.

Figure 6:
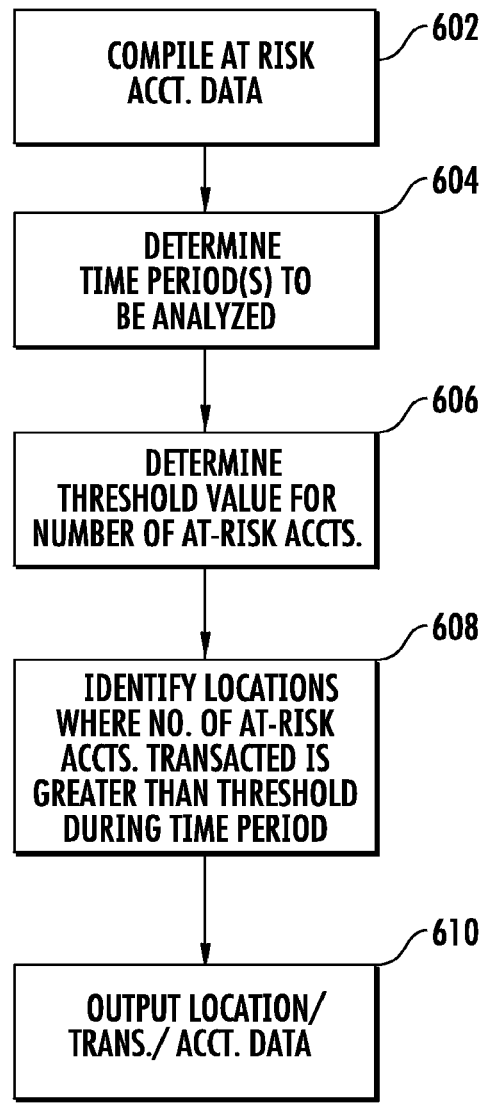
FIG. 6 is a flow chart illustrating a method of identifying one or more common points of transaction according to an exemplary embodiment.

Common point of purchase (CPP) logic 124 may be configured to identify the common transaction locations (e.g., common points of purchase, common points of transaction, or transaction locations such as ATMs, POS terminals, and so on) at which a minimum number of identified at-risk accounts have been involved in transactions. Referring to FIG. 6, CPP logic 124 may access or compile data for identified at-risk accounts (e.g., accounts with reported fraud, accounts with declined, referred, or queued transactions, accounts identified by ACD logic 122, etc.) (step 602). A time period (e.g., 1 day, 1 month, etc.) to be analyzed may then be determined or input by a user (step 604). Next, a threshold value for a minimum number of identified at-risk accounts is set (e.g., 5, 10, etc.) (step 606). CPP logic 124 may then access transaction data (e.g., data stored in transaction history logic 104) to identify any merchants or other transaction locations (i.e., common points of purchase) where the number of accounts that later became identified at-risk accounts and were involved in transactions at the merchant satisfies (e.g., meets, exceeds, etc.) the minimum threshold requirement for the minimum number of identified at-risk accounts (step 608). CPP logic may then compile the data for the common points of purchase and provide the data as an output to a user (see FIG. 7), as an input to POC logic 126 (see FIG. 8) or to another logic component (step 610).

For example, referring to FIG. 7, a listing 700 of common points of purchase is shown according to an exemplary embodiment. Listing 700 may include a transaction channel 702, a time period 704 (shown as a transaction month), transaction location information 706 for the common points of purchase, including, for example, merchant/location names and address data, a merchant ID 708 (e.g., providing a classification of each common point of purchase), a number of identified at-risk accounts 710 involved in transactions executed via the common point of purchase during time period 704, and an average transaction amount 712. By referring to a minimum number of identified at-risk accounts (e.g., 10), CPP logic 124 is able to identify which transaction locations in listing 700 are considered common points of purchase for the specific time period (e.g., the transactions above line 716 shown in FIG. 700 would be considered common points of purchase (i.e., common points of transaction) given a minimum number of identified at-risk accounts of 10 (see col. 710).

Figure 8:
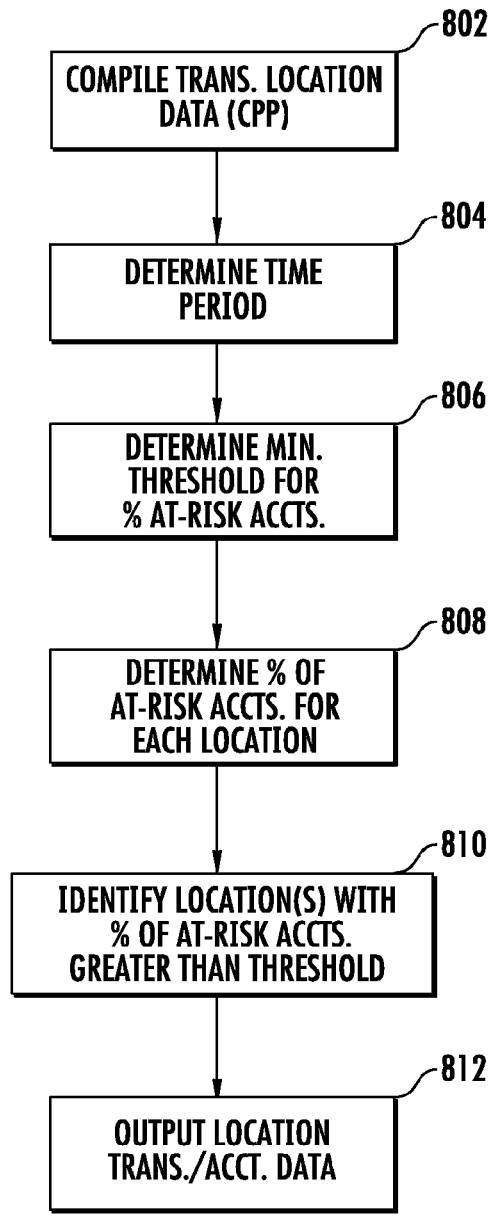
FIG. 8 is a flow chart illustrating a method of identifying one or more points of compromise according to an exemplary embodiment.

Point of compromise (POC) logic 126 may be configured to narrow the number of common points of purchase (e.g., identified by CPP logic 124) to a single or small number of transaction locations or merchants (the "point(s) of compromise) by eliminating "false-positive" indications that may be provided by CPP logic 124 due to the size of a merchant or other factors. Referring to FIG. 8, POC logic 126 first accesses data for a number of common points of purchase (step 802), which may be provided by CPP logic 124. POC logic 126 then determines or receives a time period to be analyzed (step 804), which may be the time period utilized by CPP logic 124. Next, a minimum threshold percentage is identified (step 806). The minimum threshold identifies a minimum percentage of accounts that are involved in transactions at the transaction location and are later compromised or become identified as at-risk accounts.

For each transaction location (e.g., merchant, ATM, etc.), POC logic 126 identifies the percentage of identified at-risk accounts, or at-risk percentage (step 808). According to one embodiment, in order to determine the percentage of identified at-risk accounts for each transaction location, POC logic 126 first determines the number of identified at-risk accounts that had transactions executed via the transaction location during the period of time. This value is then divided by the total number of accounts (identified at-risk accounts and not-at-risk accounts) that had transactions executed at the transaction location during the period of time. Any transaction locations with an at-risk percentage that satisfies the minimum at-risk percentage are then considered a point of compromise (step 810). Data regarding the point(s) of compromise may be output to a user, provided to risk mitigation logic 108, used as an input by EDR logic 128, or provided to other logic components (step 812).

For example, referring to FIG. 9, a listing 900 of point of compromise data is shown according to an exemplary embodiment, and may include data such as a period of time 902, point of compromise location data 904 (e.g., name, address, etc.), a transaction or merchant ID 906, the number of identified at-risk accounts 908 involved in transactions during period of time 902, an average transaction amount 910 for the at-risk transactions, a total number of accounts 912 involved in transactions during the period of time 902, an overall average transaction amount 914, and an at-risk percentage 916 (e.g., the number of identified at-risk accounts 908 divided by the total number of accounts 912). By referring to a minimum at-risk percentage, POC logic 126 may determine which transaction locations are considered points of compromise by determining which transaction locations have at-risk percentages that satisfy (e.g., meet, exceed, etc.) the minimum at-risk percentage.

According to an exemplary embodiment, POC logic 126 may further be configured to provide a daily comparison listing 1000, an exemplary embodiment of which is shown in FIG. 10. As shown in FIG. 10, listing 1000 may include a period of time 1002, a transaction channel 1004, transaction location 1006, a merchant name 1008, a merchant ID 1010, a terminal ID 1012, a merchant class 1014, a number of identified at-risk accounts 1016, an average transaction amount 1024 for the identified at-risk accounts, a total number of accounts 1026 involved in transactions during the time period 1002, an average transaction amount 1028 for all transactions, and an at-risk percentage 1030.

POC logic 126 may further be configured to provide a daily comparison of activity at various merchant locations by providing historical data for previous days, including data 1018 for 1 day earlier, data 1020 for 2 days earlier, and data 1022 for 3 days earlier. Data 1018-1022 may indicate the number of identified at-risk accounts involved in transactions on a daily basis, and therefore may indicate trends (e.g., increases or decreases in fraudulent activity) at individual transaction locations or merchants, which may be used to proactively mitigate the risks associated with the transaction locations.

Figure 11:
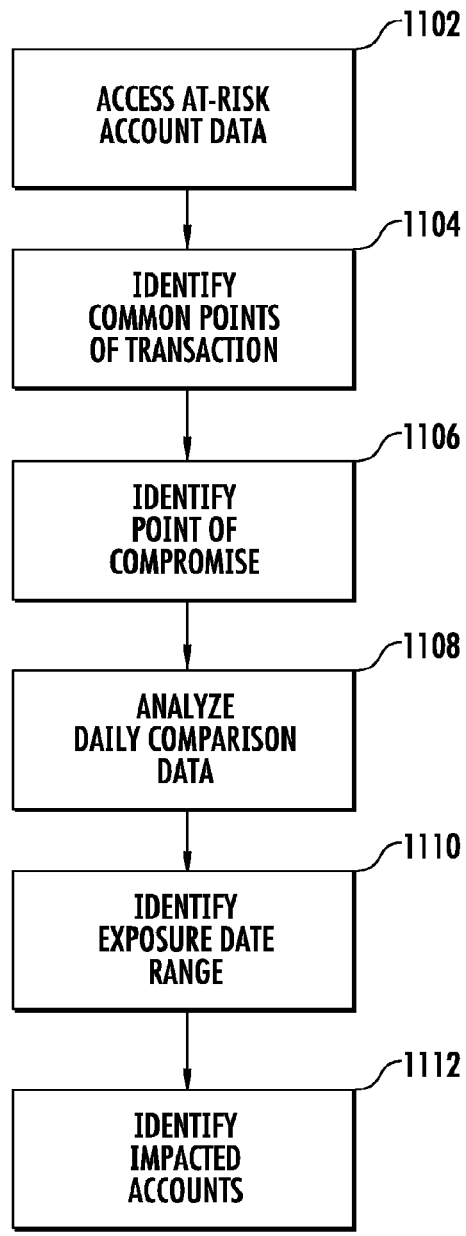
FIG. 11 is a flow chart illustrating a method of detecting account compromises according to an exemplary embodiment.

Referring now to FIG. 11, a method of detecting account compromises is illustrated according to another exemplary embodiment. As shown in FIG. 11, account data for identified at-risk accounts is accessed (step 1102). One or more common points of purchase, as described above, may then be identified by CPP logic 124 (step 1106) and one or more points of compromise may further be identified by POC logic 126 from the common points of purchase (step 1106). If desired, daily comparison of point of compromise data (see FIG. 10) may be provided (step 1108). Steps 1102-1108 may be conducted according to any of the various embodiments disclosed herein.

Referring further to FIG. 11, an exposure date range may then be identified by EDR logic 128 (step 1110), after which the risk to additional potentially impacted accounts may be mitigated (step 1112) by risk mitigation logic 108. The exposure date range may be identified as discussed in greater detail below.

Figure 12:
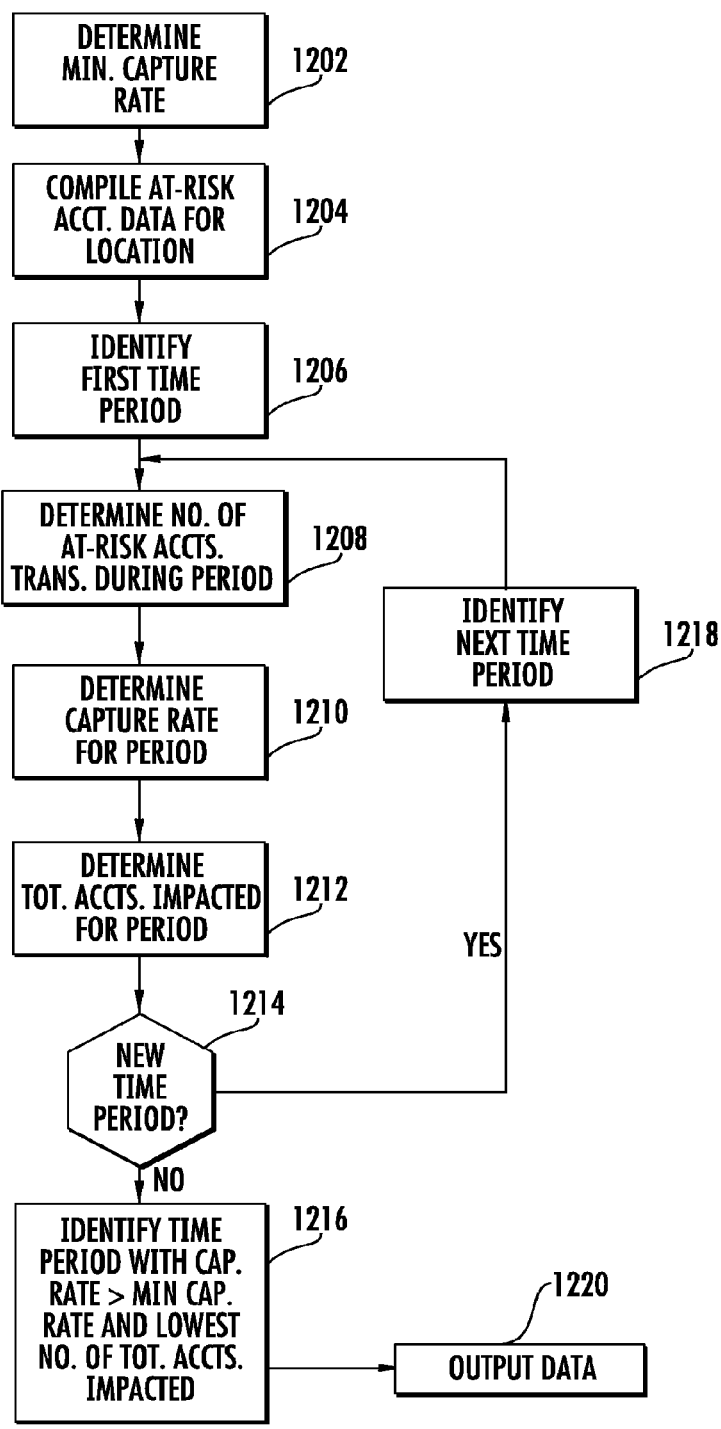
FIG. 12 is a flow chart illustrating a method of identifying an exposure date range and associated impacted accounts according to an exemplary embodiment.

Referring to FIGS. 12-13, a method of utilizing EDR logic 128 (e.g., exposure date range permutation model (ERP) logic) is illustrated according to an exemplary embodiment. EDR logic 128 may be configured to identify a probable date range for fraudulent activity, and may further be configured to maximize the capture of fraudulent activity while minimizing the total number of accounts that may be impacted by mitigation efforts such as account holds, customer notifications, card reissuances, etc. As shown in FIG. 12, a specified or minimum capture rate is first defined or received by EDR logic 128 (step 1202). The specified capture rate may be the minimum percentage of identified at-risk accounts that were involved in transactions executed via the transaction location during the exposure date range. EDR logic 128 then compiles, accesses, or otherwise receives account data for a specific transaction location or merchant (step 1204). The account data may be provided by POC logic 126 in some embodiments and may include a total number of identified at-risk accounts associated with a merchant or transaction location over a period of time.

Referring further to FIG. 12, EDR logic 128 then identifies a first time period (step 1206) (e.g., a portion of the period of time analyzed by POC logic 126). EDR logic 128 then determines, for the first time period, the number of identified at-risk accounts that were involved in transactions at the transaction location during the first period of time (step 1208) and divides the number of identified at-risk accounts involved in transactions at the transaction location during the first period of time by the total number of identified at-risk accounts associated with the transaction location to determine a capture rate for the first period of time (step 1210). EDR logic 128 then determines the total number of accounts (at-risk and not-at-risk) that were involved in transactions at the transaction location during the first period of time (step 1212). EDR logic 128 then may proceed to identify a new time period (steps 1214, 1218) and repeat steps 1208-1212 for the new time period. Alternatively, once EDR logic 128 has analyzed a sufficient number (which may be defined by a user or determined according to a number of factors) of time periods, EDR logic 128 may then identify an optimal exposure date range by identifying the time period that satisfies the specified capture rate (e.g., captures the specified percentage of identified at-risk accounts, e.g., 99%) and impacts the lowest total number of accounts (e.g., such that the total number of accounts that is impacted by risk mitigation activities is minimized while the prevention of future fraudulent activity is maximized). In some embodiments, the specified capture rate may be user-configurable such that the user may be provided with an interactive tool that permits the user to, for example, view the costs and benefits of adjusting the specified capture rate to different levels.

EDR logic 128 may provide various types of outputs identifying potential exposure date ranges and associated data. For example, FIG. 13 shows a listing 1300 of exposure date range data according to an exemplary embodiment. Listing 1300 may include a date range or period of time 1302, shown in FIG. 13 as a number of days, a start date 1304, an end date 1306, a number of identified at-risk accounts 1306 captured by date range 1302, a total number of identified at-risk accounts 1310, a capture rate 1312 for each date range 1302, and a total number of potentially impacted accounts 1314 for date range 1302. As shown in FIG. 13, if EDR logic 128 were to refer to a minimum capture rate of 99%, then the optimal date range in listing 1300 would be row 1316, where the number of days is 15, the capture rate is 99%, and the total number of impacted accounts is 1,572 (less than that of the other date ranges having capture rates of at least 99%). EDR logic 128 provides an efficient mechanism for maximizing fraud detection and capturing fraudulent activity at a specific transaction location while minimizing the mitigation effort (and the associated inconveniences to customers) required.

Figure 14:
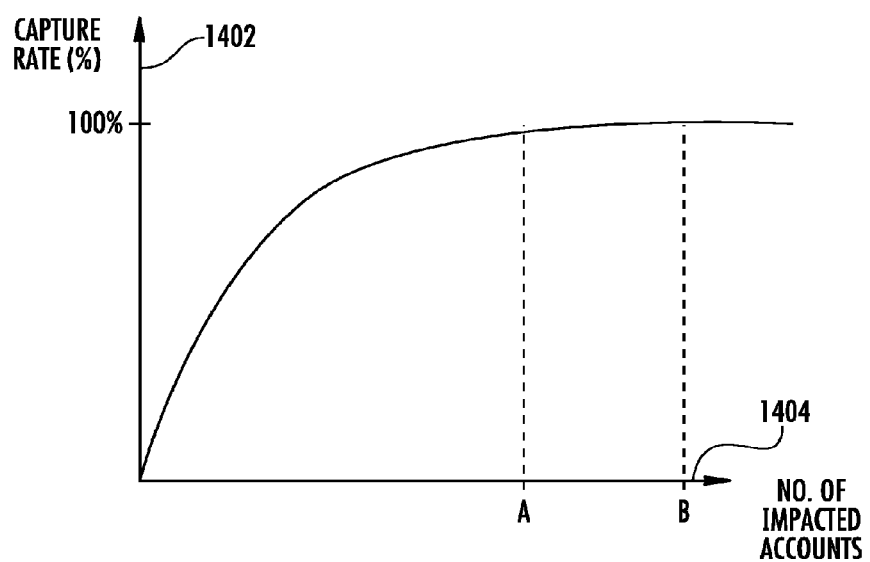
FIG. 14 is a graphical display of exposure date range data according to another exemplary embodiment.

Referring to FIG. 14, a graphical display 1400 of output from EDR logic 128 is shown according to an exemplary embodiment. As shown in FIG. 14, the vertical axis 1402 represents the capture rate, and the horizontal axis 1404 represents the number of impacted accounts. Points A and B on the graph represent different numbers of impacted accounts. According to one embodiment, EDR logic 128 may be configured to evaluate increases in the capture rate relative to increases in the number of accounts impacted. For example, after point A in FIG. 14, the marginal increase in the capture rate may not be considered as justifying the additional customers that would be impacted by mitigation activities (e.g., suspended accounts, etc.). If in fact additional accounts between points A and B are compromised, such customers may be assisted through other fraud prevention/protection programs.

It should be noted that while various logic and other components of system 102 have been illustrated as being used in conjunction with each other, any of the logic components illustrated herein may be used individually or in combinations not specifically addressed herein.

In some embodiments, the systems and methods described herein may provide advantages over more conventional fraud detection systems, including utilizing adjustable threshold parameters to identify various "sizes" of points of compromise, detecting connections and common attributes among fraud accounts, providing timely, efficient, and comprehensive detection coverage, identifying name and location information for compromised merchants, in addition to exposure time frames and volumes accounts at risk, and identifying high-risk transaction patterns prior to receipt of fraud claims. In some embodiments, potentially compromised accounts and/or credit/debit/ATM cards may be proactively deactivated to prevent additional fraud loss.

Furthermore, the various embodiments may be applied to a variety of transaction locations (e.g., compromise sources), including points of sale, ATMs, bank branches, locations utilizing PIN-pads, cross-channel applications (including, e.g., internet services), and other transaction locations or channels where customer data may be at-risk. Additionally, provisional credit (e.g., a reimbursement fund, cash advance, etc.) may be provided to customers impacted by fraudulent activity promptly, fraud claims may be disposed more efficiently and more appropriately given data evidence such as ACD data, time expenditures for fraud and customer service resources may be reduced, and customer service in handling fraud events may be improved.

Further yet, the data provided by one or more of the logic components described herein may be utilized by investigation or law enforcement personnel in investigating fraud events, providing the ability to link multiple counterfeit cards to an individual fraud event or fraudster, and further providing the ability to map out the footsteps of a fraudster by analyzing locations of intensified fraudulent activity. Also, common points of fraudulent activity (e.g., merchants where counterfeit cards are "tested") may be identified.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A method of identifying a group of potentially fraudulent transactions, comprising:
    accessing, by a computer programmed with logic, transaction data stored in a data storage system, the transaction data being associated with a plurality of financial accounts and a plurality of transaction locations;
    analyzing, by the computer, the transaction data associated with the plurality of financial accounts and the plurality of transaction locations to identify at least one group of transactions based on:
        a minimum number of transactions, wherein the minimum number of transactions are transactions executed via a single transaction location;
        a minimum dollar amount, wherein the minimum dollar amount is a minimum dollar amount for each of the minimum number of transactions; and
        a maximum time period, wherein the maximum time period defines a maximum time period during which the minimum number of transactions are executed; and
    providing an output using the computer including data associated with the group of transactions;
    identifying a point of compromise based on analyzing at-risk accounts associated with the group transactions; and
    for each of a plurality of time periods,
        determining a number of the at-risk accounts involved in transactions executed via the point of compromise during the time period;
        determining a capture rate, the capture rate being based on (i) the number of at-risk accounts involved in transactions executed via the point of compromise during the time period, and (ii) the total number of the at risk accounts; and
        determining the total number of accounts including the at-risk accounts involved in transactions executed via the point of compromise during the time period; and
    selecting an exposure date range from one of the plurality of time periods based on (i) a comparison of the capture rate of the time period with a threshold capture rate; and (ii) the total number of accounts involved in transactions during the time period.

2. The method of claim 1, wherein the single transaction location is an automated teller machine.

3. The method of claim 1, wherein accessing the transaction data includes accessing transaction data for a one day period.

4. The method of claim 1, further comprising identifying a point of compromise based on analyzing accounts associated with the group of transactions.

5. The method of claim 1, wherein the group of transactions are executed using data associated with at least one of debit cards, credit cards, and automated teller machine (ATM) cards.

6. The method of claim 1, further comprising varying a threshold associated with at least one of the minimum number of transactions, the minimum dollar amount, and the maximum time period.

7. A method of identifying a group of potentially fraudulent transactions, comprising:
    accessing, by a computer programmed with logic, transaction data stored in a data storage system, the transaction data being associated with a plurality of financial accounts and a plurality of transaction locations;
    analyzing, by the computer, the transaction data associated with the plurality of financial accounts and the plurality of transaction locations to identify at least one group of transactions based on:
        a first threshold of a minimum number of transactions executed via a single transaction location;
        a second threshold of a minimum dollar amount for each of the minimum number of transactions executed via the single transaction location; and
        a third threshold of a maximum time period during which the minimum number of transactions are executed via the single transaction location; and
    providing an output using the computer including data associated with the group of transactions; and
    varying at least one of the first threshold, the second threshold, and the third threshold based on the data associated with the group of transactions, including varying the third threshold of the maximum time period based on at least one of the number of transactions executed via the single transaction location and the minimum dollar amount for each of the transactions executed via the single transaction location.

8. The method of claim 7, wherein the single transaction location is an automated teller machine.

9. The method of claim 8, wherein accessing the transaction data includes accessing the transaction data for a single day.

10. The method of claim 8, further comprising identifying a point of compromise based on analyzing accounts associated with the group of transactions.

11. The method of claim 7, further comprising identifying a number of at-risk accounts associated with the at least one group of transactions.

* * * * *